US 6,578,699 B2

(12) United States Patent
Baird et al.

(10) Patent No.: US 6,578,699 B2
(45) Date of Patent: Jun. 17, 2003

(54) ROTARY ORIENTING FEEDER

(75) Inventors: Randy K. Baird, Bolivar, PA (US);
Kenneth D. Doak, Black Lick, PA (US); Gary L. Schucker, Saltsburg, PA (US)

(73) Assignee: FMC Technologies, Inc., Chicago, IL (US)

( * ) Notice: Subject to any disclaimer, the term of this patent is extended or adjusted under 35 U.S.C. 154(b) by 0 days.

(21) Appl. No.: 09/905,750

(22) Filed: Jul. 13, 2001

(65) Prior Publication Data

US 2003/0010605 A1 Jan. 16, 2003

(51) Int. Cl.[7] .............................................. B65G 47/24
(52) U.S. Cl. ....................................... 198/392; 198/443
(58) Field of Search .................................. 198/392, 443

(56) References Cited

U.S. PATENT DOCUMENTS 4,007,854 A  *  2/1977  Ervine .......................... 198/392
4,429,808 A  *  2/1984  Doty ............................ 198/392
4,848,559 A  *  7/1989  Hoppman et al. ............ 198/392

* cited by examiner

*Primary Examiner*—Joseph E. Valenza
(74) *Attorney, Agent, or Firm*—Wood, Phillips, Katz, Clark & Mortimer

(57) ABSTRACT

A rotary orienting feeder is configured for singulating/orienting bulk volumes of articles. The feeder includes a rotatably driven feed disc, and a rotatably driven orienting bowl assembly which is positioned generally about the feed disc. The feed disc is driven about an axis which angularly intersects an axis about which the bowl is driven, whereby during operation articles are transferred from the feed disc to an upper flange portion of the bowl assembly. An outer guide fence, which may be provided with suitable tooling, cooperates with the bowl and the articles carried thereby to effect singulation/orientation. Economical and versatile manufacture and operation are achieved by forming an outer bowl of the orienting bowl assembly of non-metallic material, such as polymeric resin. Reduced weight, reduced power consumption, quieter operation, and gentler part handling are desirably achieved.

11 Claims, 3 Drawing Sheets

ROTARY ORIENTING FEEDER

TECHNICAL FIELD

The present invention relates generally to article handling equipment in the form of a rotary orienting feeder, and more particularly to a rotary orienting feeder including an orienting bowl assembly having an annular outer bowl formed substantially entirely of non-metallic material, such a polymeric resin. The orienting bowl may be of composite configuration, including a polymeric resin and fibrous reinforcement or granular material.

BACKGROUND OF THE INVENTION

During processing of certain types of articles during manufacture or other processing, it is frequently necessary to orient and singulate the articles, thus facilitating their automated feed to associated processing equipment. Rather than employ a vibratory feed, these types of feeders typically utilize centrifugal force to create part article singulation and orientation. A bulk volume of articles are placed in the rotary orienting feeder (ROF), which then acts to singulate/orientate the articles as they are supplied to associated equipment or the like, with the articles arranged into a sequential stream where all the articles are typically each arranged in a single orientation. This type of technology is typically employed in automated processes, where relatively higher throughput is required, and can also be advantageously employed for handling articles in a more gentle fashion, with quieter handling of metallic articles typically achieved.

U.S. Pat. No. 4,830,172, hereby incorporated by reference, illustrates a typical rotary orienting feeder construction.

In a typical feeder apparatus, two key components of the apparatus, the feed disc and orienting bowl, are typically constructed of metallic material, either spun or cast metal. There have been certain constructions which have employed a feed disc formed from a non-metallic material, such as ultra-high molecular weight polypropylene resin. Heretofore, though, the orienting bowl of such feeder devices has typically been of metallic construction, including coated metallic material (i.e., a metal bowl coated with polyurethane, or a like resinous material).

In order to facilitate economical use of such rotary orienting feeders, the present invention contemplates an improved feeder construction, wherein the orienting bowl assembly of the feeder includes an outer bowl formed substantially entirely of non-metallic material, such as polymeric resin, which may be provided in a composite form such as by the inclusion of fibrous reinforcement or granular material. Use of such non-metallic material for the outer bowl allows a simpler, less costly, lower weight design to provide the required functionality.

SUMMARY OF THE INVENTION

A rotary orienting feeder embodying the principles of the present invention comprises a support frame, and a rotatably driven orienting bowl assembly mounted on the support frame for rotation about a bowl axis. In the illustrated embodiment, the feeder includes a bowl drive mounted on the support frame for rotatably driving the orienting bowl assembly.

The present feeder construction further includes a rotatably driven feed disc mounted on the support frame for rotation about a disc axis for transferring articles to be oriented from the disc to the bowl. The disc axis angularly intersects the bowl axis, whereby articles being oriented are transferred from the feed disc to an upper, out-turned flange of the outer bowl of the bowl assembly. In the illustrated form, a disc drive mounted on the support frame rotatably drives the feed disc independently of the orienting bowl assembly.

Containment and orientation of articles is effected by the provision of a guide fence which extends generally about the orienting bowl for guiding articles to be oriented toward a discharge of the feeder. Depending upon the specific nature of the articles to be handled, suitable tooling can be mounted along the guide fence whereby engagement with the articles being handled effects singulation/orientation.

In accordance with the present invention, the orienting bowl assembly comprises a central support structure and an outer annular bowl mounted on the support structure. The outer bowl is substantially entirely of non-metallic construction to facilitate cost-effective fabrication of the feeder apparatus.

In a current embodiment, the outer bowl of the orienting bowl assembly has been formed from a suitable polymeric material. It is within the purview of the present invention that the outer bowl be formed as a composite construction, such as including polymeric resin with fibrous reinforcement, or polymeric resin with the inclusion of granular material (such as for creating a roughened interior for the bowl). As will be evident, other various, suitable non-metallic materials may be employed. The use of such materials facilitates formation of a simpler, lower cost bowl assembly, which can be of a lighter weight in construction for ease of operation. The non-metallic material from which the bowl is formed can be selected depending upon the particular types of articles to be handled, such as to exhibit chemical resistance, for example. In comparison to typical metallic constructions, the present invention facilitates ease of integration of orienting tooling features, and avoids the need for special coatings for special part handling requirements, as are sometimes necessary. Easier maintenance, and easier part stocking, due to lighter weight, are also desirably achieved.

The outer bowl of the orienting bowl assembly can be sized as required for a wide variety of applications, and is typically configured to have an inside diameter between about 10 and 72 inches. Depending on the specific application, the associated feed disc of the feeder can also be formed substantially entirely of non-metallic material or, substantially entirely of metallic material.

Other features and advantages of the present invention will become readily apparent from the following detailed description, the accompanying drawings, and the appended claims.

DETAILED DESCRIPTION

Figure 1:
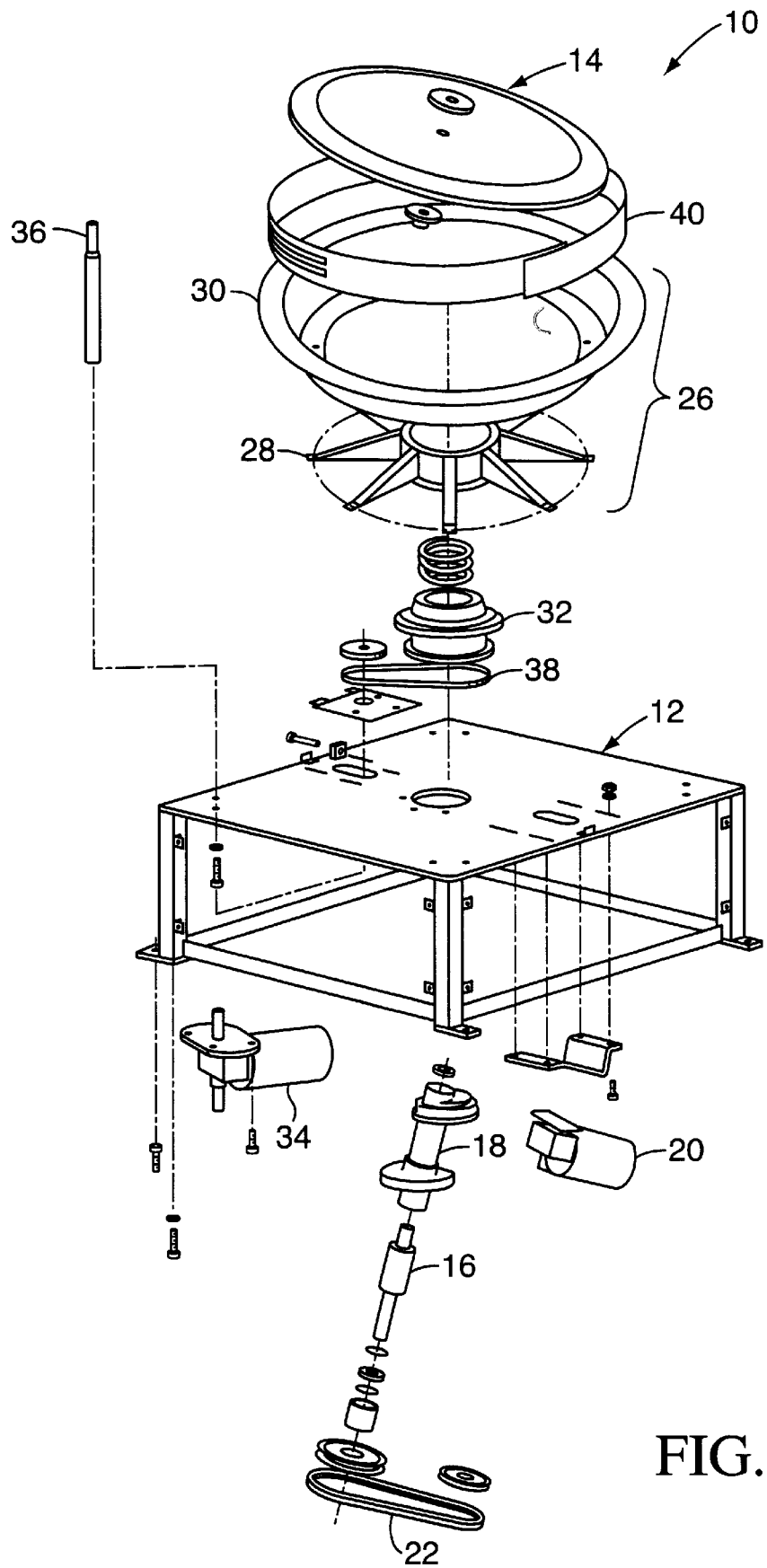
FIG. 1 is an exploded, perspective view of a rotary orienting feeder embodying the principles of the present invention.

While the present invention is susceptible of embodiment in various forms, there is shown in the drawings, and will hereinafter be described, a presently preferred embodiment, with the understanding that the present disclosure is to be considered as an exemplification of the invention, and is not intended to limit the invention to the specific embodiment illustrated.

Figure 2:
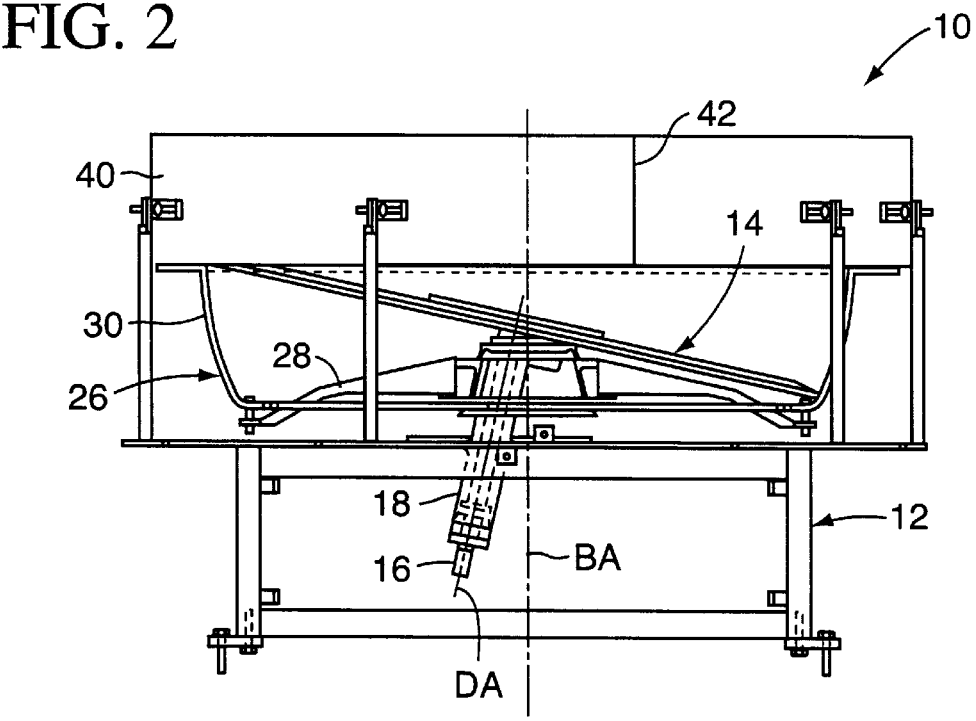
FIG. 2 is a diagrammatic, side elevational view of the present rotary orienting feeder.
Figure 3:
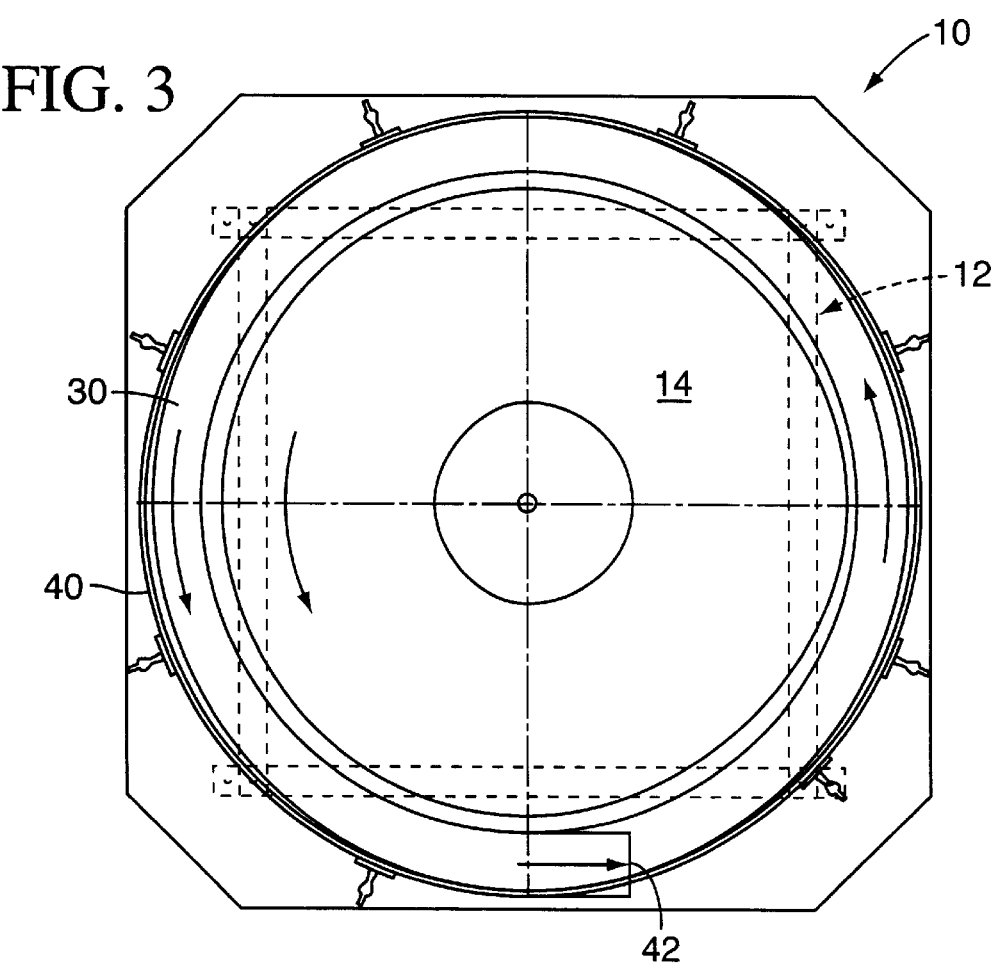
FIG. 3 is a diagrammatic, top plan view of the present rotary orienting feeder.

With reference to FIGS. 1, 2, and 3, therein is illustrated a rotary orienting feeder 10 embodying the principles of the present invention. This type of article handling equipment is particularly suited for handling bulk volumes of individual articles, wherein it is desired to singulate (i.e., form a single, sequential stream of articles) and orientate (i.e., arrange each of the articles in the same, single orientation) such as for delivery during automated processing to associated equipment and the like. By way of example, plastic closures for containers are typically singulated and oriented (e.g., all top-side up, or all top-side down) for delivery to associated bottling equipment.

The rotary orienting feeder 10 comprises a support frame 12 upon which the various components of the feeder are mounted. Orientation of bulk articles is effected by the provision of a rotatably driven feed disc 14 which, as illustrated, is angularly oriented for rotation about a disc axis DA. Drive of feed disc 14 is effected via a drive shaft 16 which operates through an angular drive housing 18 mounted on support frame 12. A disc drive motor 20 is operatively connected to drive shaft 16 by a drive belt 22, and suitable drive pulleys, to effect driven rotation of the feed disc 14.

The orienting feeder 10 further includes an orienting bowl assembly 26 which is positioned generally about the feed disc 14. The bowl assembly 26 includes a central support structure 28, and an annular outer bowl 30 which is fitted in closely spaced relationship to the feed disc 14. The arrangement is such that as articles are carried by the rotatably driven feed disc 14, articles are transferred to the upper portion of the bowl 30 acting to form a single stream of the articles.

The orienting bowl assembly 26 is rotatably driven about a bowl axis BA, which in the illustrated embodiment is vertically oriented. Thus, the disc axis about which feed disc 14 rotates angularly intersects the bowl axis about which orienting bowl assembly 26 rotates. This relationship is best illustrated in FIG. 2, wherein the angularly intersecting relationship of bowl axis BA and disc axis DA is illustrated.

Rotatable drive of the bowl assembly 26 is effected via a drive hub 32 (FIG. 1) upon which support structure 28 is mounted. The drive hub is rotatably driven by a bowl drive motor 34, which acts through a drive shaft 36 and drive belt 38, whereby the bowl assembly is driven independently of the rotatably driven feed disc 14.

The orienting feeder 10 further includes a guide fence 40 which extends generally about the orienting bowl assembly 26 for guiding articles to be oriented toward a discharge 42 of the feeder. In the preferred form, the fence 40 can be adjustably positioned, and provides a mounting surface for tooling which cooperates with the articles being handled for singulation and orientation of the articles. As the articles are transferred from the rotating feed disc 14 onto the upper edge of the rotating bowl assembly 26 (with transfer generally being effected at the highest edge portion of the feed disc 14), the articles engage suitable tooling as may be required, mounted on fence 40, so that the articles leave the feeder discharge 42 in the desired singulated, oriented fashion. The orienting fence 40 thus acts to contain the articles as they are moved by the rotating feed disc 14 and bowl assembly 26.

In accordance with the present invention, the outer bowl 30 of the orienting bowl assembly 26 is formed substantially entirely of non-metallic material, preferably polymeric resin. In a current embodiment, black ABS anti-static resin, 0.30 inches thick, has been employed for fabrication of the outer bowl 30, with such material available from Total Plastics, Inc., of Pittsburgh, Pa.

It is within the purview of the present invention that the outer bowl 30 be formed of composite material, such as a polymeric resin and fibrous reinforcement, or polymeric resin and granular material (which can be employed to enhance the surface roughness of the bowl).

Figure 4:
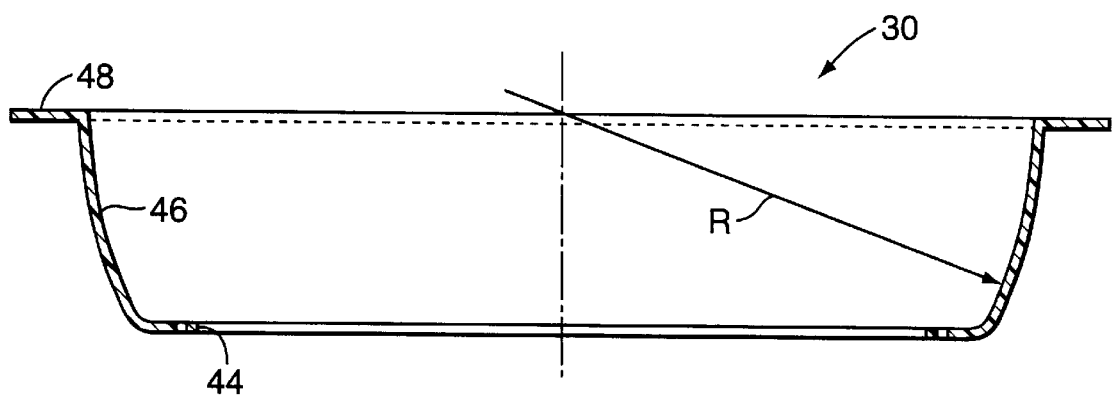
FIG. 4 is a cross-sectional view of an outer bowl of the orienting bowl assembly of the present rotary orienting feeder.

FIG. 4 is a cross-sectional view of outer bowl 30 configured in accordance with the present invention. The bowl 30 includes a lower mounting portion 44 having suitable openings for mechanical fasteners for securement of the bowl to the support structure 28 of the bowl assembly. The bowl 30 further includes an upstanding sidewall 46, with an out-turned flange 48 extending outwardly from the upper extent of sidewall 46. The upstanding sidewall 46 preferably has an arcuate, cross-sectional configuration of substantially constant radius R. Because it is envisioned that a rotary orienting feeder embodying the principles of the present invention can be appropriately sized for handing a wide variety of different types of articles, it is contemplated that outer bowl 30 be provided with an inside diameter ranging from about 10 inches to 72 inches.

By formation of outer bowl 30 from a low cost, anti-static, non-metallic FDA polymer, a number of advantages are employed which facilitate economical manufacture and operation of rotary orienting feeder 10. The outer bowl 30 is manufactured to operate with minimal vertical and radial run outs, and is configured to be of sufficient stiffness for general non-metallic and metallic parts handling applications. As noted, the bowl can be sized for use with a polymer-based feed disc 14, with the combination of the non-metallic bowl and disc allowing for feeding of a large range of non-metallic parts.

Economical manufacture of the outer bowl 30 can be effected by thermal-forming, but it is within the purview of the present invention that the bowl can be otherwise formed. Notably, the relatively lightweight of the outer bowl allows the feeder 10 to use less power during operation, thus desirably reducing manufacturing and operating costs. Assembly of the feeder apparatus is facilitated by use of the non-metallic outer bowl 30, with desirably lower noise levels achieved during operation, and with reduced damage to parts being handled. By virtue of the wide range of non-metallic materials which can be employed for manufacture of the bowl, desirable versatility is obtained in feeder design for selecting the proper bowl material for a specific part handling application.

From the foregoing, it will be observed that numerous modifications and variations can be effected without departing from the true spirit and scope of the novel concept of the present invention. It is to be understood that no limitation with respect to the specific embodiment illustrated herein is intended or should be inferred. The disclosure is intended to cover, by the appended claims, all such modifications as fall within the scope of the claims.

What is claimed is:

1. A rotary orienting feeder, comprising:
  a support frame;

a rotatably driven orienting bowl assembly mounted on said support frame for rotation about a bowl axis;

a rotatably driven feed disc mounted on said support frame for rotation about a disc axis for transferring articles to be oriented from said disc to said bowl; and a guide fence extending generally about said orienting bowl assembly for guiding articles to be oriented toward a discharge of the feeder, said orienting bowl assembly comprising a central support structure, and an annular outer bowl, said outer bowl being substantially entirely of non-metallic construction to facilitate fabrication by thermo-forming sheet material, said outer bowl including a lower mounting portion for securement to said central support structure, said lower mounting portion being positioned beneath said feed disc with said central support structure extending inwardly of said lower mounting portion, said outer bowl including an upstanding side wall extending upwardly from said lower mounting portion, said upstanding side wall extending above said feed disc.

2. A rotary orienting feeder in accordance with claim 1, wherein:

said outer bowl of said orienting bowl assembly is of composite construction.

3. A rotary orienting feeder in accordance with claim 2, wherein:

said outer bowl of said orienting bowl assembly is of a polymeric resin/fibrous reinforcement composite construction.

4. A rotary orienting feeder in accordance with claim 2, wherein:

said outer bowl of said orienting bowl assembly is of a polymeric resin/granular material composite construction.

5. A rotary orienting feeder in accordance with claim 1, wherein:

said outer bowl of said orienting bowl assembly has an inside diameter between about 10 and 72 inches.

6. A rotary orienting feeder in accordance with claim 1, wherein:

said feed disc is formed substantially entirely from non-metallic material.

7. A rotary orienting feeder in accordance with claim 1, wherein:

said feed disc is formed substantially entirely of metallic material.

8. A rotary orienting feeder, comprising:

a support frame;

a rotatably driven orienting bowl assembly mounted on said support frame for rotation about a bowl axis, said bowl assembly comprising a central support structure and an annular outer bowl, said outer bowl having a lower mounting portion, an upstanding side wall, and an out-turned flange at the upper extent of said side wall;

a bowl drive mounted on said support frame for rotatably driving said orienting bowl assembly;

a rotatably driven feed disc mounted on said support frame for rotation about a disc axis that angularly intersects said bowl axis, for transferring articles to be oriented from said feed disc to said out-turned flange of said outer bowl, said lower mounting portion of said orienting bowl being positioned beneath said feed disc, with said central support structure extending inwardly of said lower mounting flange, said upstanding side wall and said out-turned flange extending above said feed disc;

a disc drive mounted on said support frame for rotatably driving said feed disc independently of said orienting bowl assembly; and a guide fence extending generally about the out-turned flange of said outer bowl for guiding articles to be oriented toward a discharge of the feeder, said outer bowl of said orienting bowl assembly being of substantially entirely of non-metallic, thermo-formed sheet construction to facilitate fabrication.

9. A rotary orienting feeder in accordance with claim 2, wherein:

said outer bowl of said orienting bowl assembly is of composite construction.

10. A rotary orienting feeder in accordance with claim 8, wherein:

said out-turned flange of said outer bowl is substantially parallel to said lower mounting portion.

11. A rotary orienting feeder in accordance with claim 10, wherein:

said upstanding sidewall has an arcuate, cross-sectional configuration of substantially constant radius.

* * * * *